Sept. 20, 1927.

H. M. PFLAGER

BOOSTER MOTOR TRUCK

Filed July 25, 1925

1,642,890

INVENTOR:-
Harry M. Pflager

By Cornwall, Bedell & Janney
ATTORNEYS

Patented Sept. 20, 1927.

1,642,890

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

BOOSTER-MOTOR TRUCK.

Application filed July 25, 1925. Serial No. 46,038.

My invention relates to railroad rolling stock and consists in an improved truck construction, especially adapted for use on booster motor trucks, and in the combination of a booster motor with the truck. This application is a continuation in part of my copending application Serial No. 640,637, filed May 22, 1923.

The main object of my invention is to provide a truck having more than one pair of wheels which is normally an ordinary truck carrying a dead weight which is ordinarily equally distributed to all of the truck wheels but which, under certain conditions, will be distributed unequally to the wheels. In other words, all of the truck wheels will share the ordinary load but when the booster motor is operating, the wheels which it drives will receive a greater portion of the load, thereby making them more efficient as driving wheels.

An advantageous application of my invention may be made to the trucks of a locomotive tender which are normally load carrying trucks only. I apply my booster motor to one axle of such a truck, preferably the rear axle, so that the motor can be used for assisting the locomotive in starting heavy trains or in moving up steep grades.

In the accompanying drawings which illustrate a selected embodiment of my invention—

Figure 1:
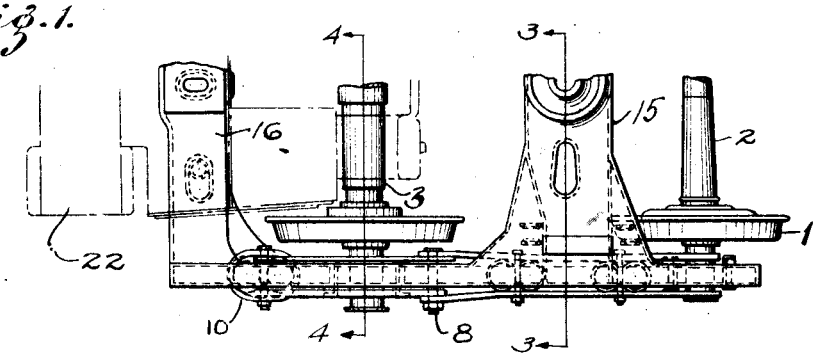
Figure 1 is a top view of one-half of a truck, it being understood that the other half is a duplicate of that shown.
Figure 2:
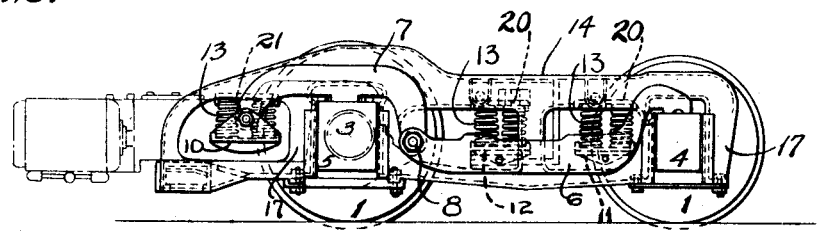
Figure 2 is a side elevation of the truck.
Figure 3:
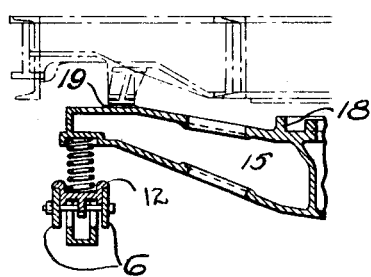
Figure 4:
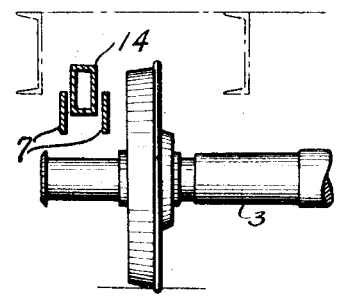

Figures 3 and 4 are transverse vertical sections taken on line 3—3 and 4—4, respectively, of Figure 1.

In Figures 3 and 4 parts of the tender body are indicated in dot and dash lines simply for the purpose of illustrating the relative position of the body and truck. It will be understood that the body forms no part of the present invention.

The truck shown is a four-wheel truck having wheels 1, axles 2 and 3, and journal boxes 4 and 5, respectively, of any ordinary type. The load is carried by the journal boxes through equalizers 6 and 7. Equalizer 6 has one end resting upon journal box 4 and it extends therefrom toward journal box 5 but does not engage the latter. Journal box 5 supports equalizer 7 intermediate the ends of the latter, one of which ends is connected at 8 to the adjacent end of equalizer 6 and the other of which carries a spring seat 10. Similar spring seats 11 and 12 are carried by equalizer 6 and preferably these seats are nearer to axle 2 than to axle 3.

Spring means, here shown as coil springs 13, are mounted upon each spring seat and it will be understood that these springs may be of the coil type shown or of leaf type and arranged in groups or singly, as desired. Carried by springs 13 is the truck frame, here shown as a one-piece casting, including a wheel piece 14, a bolster 15, an end transom 16, pedestals 17, a vehicle body supporting center plate 18, side bearings 19, and spring caps 20 and 21. It will be noted that the bolster 15 and center plate 18 are located intermediate of spring seats 11 and 12, and nearer to axle 2 than to axle 3, thereby distributing the major portion of the weight of the vehicle body to journal boxes 4 and 5 through equalizer 6 and the adjacent half of equalizer 7 while the remaining portion of the weight is transmitted along the wheel piece 14 through spring cap 21 to spring seat 10 and the other half of equalizer 7.

A booster motor is indicated at 22, with its frame mainly supported by end transom 16, but partially supported by axle 3 to which the booster motor is operatively connected in the usual manner. The end transom 16 is located approximately at the longitudinal center of gravity of the motor; hence very little of the dead weight of the motor is normally carried directly by axle 3. The arrangement of the equalizers, proportions of their lengths, and location of the body support 18 and transom 16 are such that the combined dead weights of the body and motor are normally equally divided between the two axles 3 and 4.

Although the dead weights of the body and of the booster motor are transmitted equally to the axles, when the booster motor is operating the relation between the members supporting it and the members resisting its thrust is such that the torque will have the effect of adding weight to the driver axle, which weight is, of course, taken from the other axle through the equalizing system and the truck frame will bear more heavily on the springs nearest the motor. This increases the weight on the driving wheels and increases their adhesion to the rail which, of course, is desirable when they are acting as driving wheels.

Figure 4 shows that the equalizers are formed in pairs and that the wheel piece 14 of the truck frame is positioned partly between the corresponding pairs of equalizers. This construction is of course optional as well as the provision of the frame by means of an integral casting and various modifications of these and other details of the structure shown may be made without departing from the spirit of my invention as expressed in the appended claims.

I claim:

1. In a truck, axles, equalizers supported thereon, a truck frame supported on said equalizers, a superstructure support element on said truck frame between said axles, and a motor frame supported near its longitudinal center of gravity on one end of said truck frame beyond the nearest axle.

2. In a truck, spaced axles, equalizers mounted thereon, a body supporting truck frame carried by said equalizers, a booster motor located outside of said axles and mounted on said frame and one of said axles, the points of support of body and booster motor load on said frame being so arranged that the weight supported by the frame is substantially equally distributed to said axles.

3. In a truck, spaced axles, a truck frame carried thereby, a superstructure support element on said truck frame between said axles, a booster motor outside of said axles and mounted on said frame and one of said axles, said element and motor being so positioned on said frame relatively to said axles that the combined weight of the body supported by said elements and the dead weight of said booster motor is substantially equally distributed to said axles.

4. In a truck, spaced axles, equalizers mounted thereon, a truck frame carried by said equalizers, a booster motor mounted on said frame and one of said axles, a superstructure supporting element on said truck frame, said motor frame, equalizers and element being so arranged that the dead weight of body and booster motor is substantially equally distributed to both of said axles but that the operation of said booster motor increases the proportion of weight on the axle connected thereto.

5. In a truck, spaced axles, equalizers mounted thereon, a truck frame carried by said equalizers and supported thereon at points located between said axles and beyond one of them respectively, and a booster motor supported by said frame at a point beyond the outer frame supporting points on said equalizers.

6. In a truck, spaced axles, a frame supported on both of said axles and projecting beyond one of them, a motor mounted on the projecting portion of said frame and on the adjacent axle, the frame mounting of said motor being substantially beneath the center of gravity of said motor.

7. In a truck, two axles, an equalizer supported on one axle and extending toward the other axle, an equalizer supported on the other axle and extending in both directions therefrom, one extension supporting an end of said first-mentioned equalizer, and a truck frame mounted on said first-mentioned equalizer and on the other extension of said second-mentioned equalizer.

8. In a truck, two axles, an equalizer supported on one axle and extending toward the other axle, an equalizer supported on the other axle and extending in both directions therefrom, one extension supporting an end of said first-mentioned equalizer, a truck frame mounted on said first-mentioned equalizer and on the other extension of said second-mentioned equalizer, and a booster motor carried upon said frame at a point beyond said frame support.

9. In a truck, two axles, an equalizer supported on one axle and extending toward the other axle, an equalizer supported on the other axle and extending in both directions therefrom, one extension supporting an end of said first-mentioned equalizer, spring means seated on said first-mentioned equalizer, spring means seated on the other extension of said second-mentioned equalizer, and a truck frame supported on all of said means and having a load supporting point over said first-mentioned spring means.

10. In a truck, two axles, an equalizer supported by one axle and extending toward the other axle, an equalizer supported on the other axle and extending in both directions therefrom, one extension supporting an end of said first-mentioned equalizer, spring means seated on said first-mentioned equalizer, spring means seated on the other extension of said second-mentioned equalizer, and a truck frame supported on all of said means and having load supporting points over said first-mentioned spring means and beyond said second-mentioned spring means.

11. In a truck, two axles, an equalizer supported on one axle and extending toward the other axle, an equalizer supported on the other axle and extending in both directions therefrom, one extension supporting an end of said first-mentioned equalizer, spring means seated on said first-mentioned equalizer, spring means seated on the other extension of said second-mentioned equalizer, and a truck frame supported on all of said means and having a car body supporting center plate over said first-mentioned means and a booster motor support beyond said second-mentioned means.

12. In a truck, two axles, an equalizer supported on one axle and extending toward the other axle, an equalizer supported on the other axle and extending in both directions therefrom, one extension supporting an end of said first-mentioned equalizer, spring means seated on said first-mentioned equalizer, spring means seated on the other extension of said second-mentioned equalizer, and a one-piece cast truck frame supported on all of said means and having load supporting points over said first-mentioned means and beyond said second-mentioned means.

13. In a truck, spaced axles, equalizers mounted thereon, a truck frame carried by said equalizers and supported thereby at points located between said axles nearer one of said axles than the other and at points beyond the latter axle.

14. In a truck, spaced axles, equalizers mounted thereon, a truck frame carried by said equalizers and supported thereby at points located between said axles nearer one of said axles than the other and at points beyond the latter axle, and a booster motor supported by said frame at a point beyond the outer frame supporting point on said equalizers.

15. In a truck, two axles, an equalizer supported on one axle and extending toward the other axle, an equalizer supported on the other axle and extending in both directions therefrom, one extension supporting an end of said first-mentioned equalizer, and a truck frame mounted on said first-mentioned equalizer and on the other extension of said second-mentioned equalizer and provided with a body supporting bearing nearer to said first-mentioned axle and with a motor supporting bearing beyond the other of said axles.

16. In a truck, two axles, an equalizer supported on one axle and extending toward the other axle, an equalizer supported on the other axle and extending in both directions therefrom, one extension supporting an end of said first-mentioned equalizer, and a truck frame mounted on said first-mentioned equalizer and on the other extension of said second-mentioned equalizer and provided with a body supporting bearing nearer to said first-mentioned axle and with a motor supporting bearing beyond the other of said axles and below the level of the adjacent truck support.

17. In a truck, two axles, an equalizer supported on one axle and extending toward the other axle, an equalizer supported on the other axle and extending in both directions therefrom, one extension supporting an end of said first-mentioned equalizer, spring means seated on said first-mentioned equalizer, spring means seated on the other extension of said second-mentioned equalizer, and a truck frame supported on all of said means and having a load supporting point over said first-mentioned spring means and located nearer to said first-mentioned axle than to said other axle.

18. In a truck, spaced axles, a truck frame carried by said axles and supported at points located between said axles and at points beyond one of them, and a booster motor supported by said frame at a point beyond the outer frame support.

19. A locomotive booster apparatus comprising in combination, a truck frame having a plurality of wheel axles, a pair of weight distributing levers resting upon and straddling the opposite ends of one axle, a second pair of weight distributing levers resting at one end upon the opposite ends of another axle and extending toward the near ends of said first levers to which they are pivotally connected, and an auxiliary motor adapted to drive the axle which is straddled by the first pair of levers supported in part at least on the frame and arranged so that its operating torque will act through the weight distributing levers to throw a greater proportion of the load on the driven axle than on said other axle.

20. A locomotive booster apparatus comprising in combination, a truck frame having a plurality of wheel axles, weight distributing structure comprising pairs of levers pivoted together and carried on the axles, means for transmitting the load from the frame to the axles through said weight distributing structure, and an auxiliary motor adapted to drive one of the axles, the torque of the motor when driving acting on the distributing structure to increase the load on the driven axle.

In testimony whereof I hereunto affix my signature this 21st day of July, 1925.

H. M. PFLAGER.